US005634952A

United States Patent [19]

Kasai et al.

[11] Patent Number: 5,634,952

[45] Date of Patent: Jun. 3, 1997

[54] EXHAUST GAS FILTER AND APPARATUS FOR TREATING EXHAUST GASES USING THE SAME

[75] Inventors: Yoshiyuki Kasai; Yoshiro Ono; Ikuko Ishiyama, all of Nagoya, Japan

[73] Assignee: NGK Insulators, Ltd., Japan

[21] Appl. No.: 466,736

[22] Filed: Jun. 6, 1995

[30] Foreign Application Priority Data

Jun. 21, 1994 [JP] Japan .................................... 6-137713

[51] Int. Cl.$^6$ ............................ B01D 39/20; B01D 46/00

[52] U.S. Cl. ................................ 55/302; 55/523; 55/524; 55/DIG. 30

[58] Field of Search ............................ 55/302, 523, 524, 55/DIG. 30

[56] References Cited

U.S. PATENT DOCUMENTS

| | | | |
|---|---|---|---|
| 4,632,683 | 12/1986 | Fukutani et al. | 55/523 |
| 4,746,341 | 5/1988 | Komada | 55/523 X |
| 4,869,944 | 9/1989 | Harada et al. | 55/523 X |
| 4,902,314 | 2/1990 | Mizukami et al. | 55/523 X |
| 4,902,319 | 2/1990 | Kato et al. | 55/523 |
| 4,912,076 | 3/1990 | Mizrah et al. | 55/523 X |
| 4,923,484 | 5/1990 | Saito | 55/523 X |
| 5,045,097 | 9/1991 | Langen | 55/523 X |
| 5,069,697 | 12/1991 | Hamaguchi et al. | 55/DIG. 30 |
| 5,073,178 | 12/1991 | Mimori et al. | 55/524 X |
| 5,087,277 | 2/1992 | Gonzalez et al. | 55/524 X |
| 5,098,455 | 3/1992 | Doty et al. | 55/523 |
| 5,195,319 | 3/1993 | Stobbe | 55/DIG. 30 |
| 5,417,728 | 5/1995 | Royle | 55/523 X |

FOREIGN PATENT DOCUMENTS 3-47507 2/1991 Japan .

*Primary Examiner*—Robert Spitzer
*Attorney, Agent, or Firm*—Parkhurst, Wendel & Burr, LLP

[57] ABSTRACT

An imaginary plane dividing a profile of a rough surface of a filter into halves with equal volume is defined as a mean plane. Assuming cutting the filter with the mean plane, a ratio of the total cross-sectional area of the recesses appearing to the whole area of the mean plane is defined as a Valley Level. An exhaust gas filter having a surface with a Valley Level of at most 20%, a porosity of 40% to 55% and an average pore diameter of 5 μm to 50 μm effectively collects fine particles contained in exhaust gases discharged from internal combustion engines, such as diesel engines, with little pressure loss, and has an improved releasability of deposited fine particles and can be readily regenerated by flow of blowback air, with high efficiency. When the filter has a specified two-layer structure, the Valley Level is readily controllable.

4 Claims, 2 Drawing Sheets

EXHAUST GAS FILTER AND APPARATUS FOR TREATING EXHAUST GASES USING THE SAME

BACKGROUND OF THE INVENTION

1. Field of the Invention

The present invention relates to exhaust gas filters for collecting fine particles which are contained in exhaust gases discharged from internal combustion engines, such as diesel engines, and apparatuses for treating exhaust gases with such filters.

2. Description of the Prior Art

Exhaust gases generally contain fine particles comprising, as a main ingredient, carbon, other than nitrogen oxides $NO_x$, carbon monoxide CO, hydrogen carbides HC or the like. These fine particles per se not only cause air pollution but also deteriorate, as poison, catalytic activity of catalysts for purifying $NO_x$, CO, HC or the like. Therefore, various exhaust gas filters for collecting those fine particles have so far been proposed.

Exhaust gas filters require characteristics, such as low pressure loss, high efficiency of collecting fine particles, high compressive strength, high thermal shock resistance or the like. Additionally, it is important that the exhaust gas filters can be regenerated with high efficiency, because the filters, since fine particles deposit thereon during filtration, require an intermittent regeneration by removing the deposits. If the regeneration efficiency is low, long use of the filter will result in increase of its pressure loss.

Japanese Patent Application Laid-open No. 03-47,507 discloses a technique for obtaining an excellent filter by superimposing a filter layer having an average pore diameter of 0.2–10 μm on a filter substrate having an average pore diameter of 10–100 μm and a ratio of the pore diameter in the position of 75 vol. % to that in the position of 25 vol. %, with respect to a cumulative pore distribution, of at least 1.3, which filter layer is fixed on the filter substrate in such a manner that the filter layer may block open-pores on the surface of the filter substrate.

As a process for regenerating filters, it has been known that collected fine particles are burnt up in situ on the filters by raising the temperature of the filters. Alternatively, there has also been known another conventional process wherein collected fine particles on filters are blown away by injecting blowback air into the filters counter to exhaust gas flow, and then the fine particles are burnt up. The latter process wherein the fine particles are blown away by blowback air has the advantage in that the life of the filters is generally extended, as compared with the former process wherein the fine particles are burnt up in situ on the filters.

However, the above conventional blowback process has posed a problem of an insufficient ability of regenerating filters during the blowback, resulting in increase of pressure losses with the lapse of time of collection operation, though it may partly depend on the properties of the filters. Alternatively, in the case where the filters are formed into a two-layer structure such as disclosed in Japanese Patent Application Laid-open No. 03-47,507, even with such a filter, a problem of increase in pressure loss has been posed, though it may depend upon the material that forms the filter layer.

SUMMARY OF THE INVENTION

The object of the present invention is to provide an exhaust gas filter having regeneration efficiency improved by blowback air and exhibiting little increase in pressure loss even after long use, and an apparatus for treating exhaust gases with such filters.

The above object is achievable by a first embodiment of the present invention, that is, an exhaust gas filter for collecting fine particles contained in exhaust gases discharged from internal combustion engines, characterized by a Valley Level as defined hereinafter of a surface of the filter of not more than 20%, a porosity of the filter of between 40% and 55%, and an average pore diameter of the filter of between 5 μm and 50 μm.

Alternatively, the object of the present invention also can be attained by a second embodiment of the present invention, that is, an exhaust gas filter for collecting fine particles contained in exhaust gases discharged from internal combustion engines, comprising a filter substrate and a filter layer provided on the surface of the filter substrate, which gas filter is characterized in that the above filter layer has a surface with a Valley Level as defined hereinafter of not more than 20%, and the above filter substrate has a porosity of between 45% and 60% and an average pore diameter of between 10 μm and 80 μm. In this second embodiment, the filter layer is preferred virtually not to block open-pores on the surface of the filter substrate.

According to the present invention, the exhaust gas filter is preferred to comprise a ceramic material comprising at least one main crystalline component selected from the group consisting of cordierite, mullite and alumina.

Further, the exhaust gas filter of the present invention is preferred to be composed of a honeycomb structure.

Furthermore, the exhaust gas filter of the present invention is preferred to comprise a ceramic material comprising, as the main crystalline component, particularly cordierite, and have a coefficient of thermal expansion, along a direction of exhaust flow, of at most $1.0\times10^{-6}/°$ C. between 40° C. and 800° C.

BRIEF DESCRIPTION OF THE DRAWINGS

The above and other objects, features and advantages of the present invention will become more apparent from reading the following description of the preferred embodiments taken in connection with the accompanying drawings, wherein.

DESCRIPTION OF THE PREFERRED EMBODIMENT(S)

In the present invention, conditions of the surface of a filter is evaluated by means of "Valley Level".

The term "Valley Level" used throughout this specification will be explained hereinafter.

The surface roughness of a filter is determined by means of an instrument for the measurement of surface roughness by the stylus method according to JIS B-0651. The obtained data is three-dimensionally analyzed and a plane dividing the profile of the filter surface into halves having an equal volume: an upper half of projections and a lower half of recesses, is imagined. This imaginary plane is defined as a mean plane. When the filter is assumed to be cut on the level of the mean plane, a ratio of the total cross-sectional area of the recesses appearing on the mean plane to the whole area of the mean plane is defined as a Valley Level.

Figure 1:
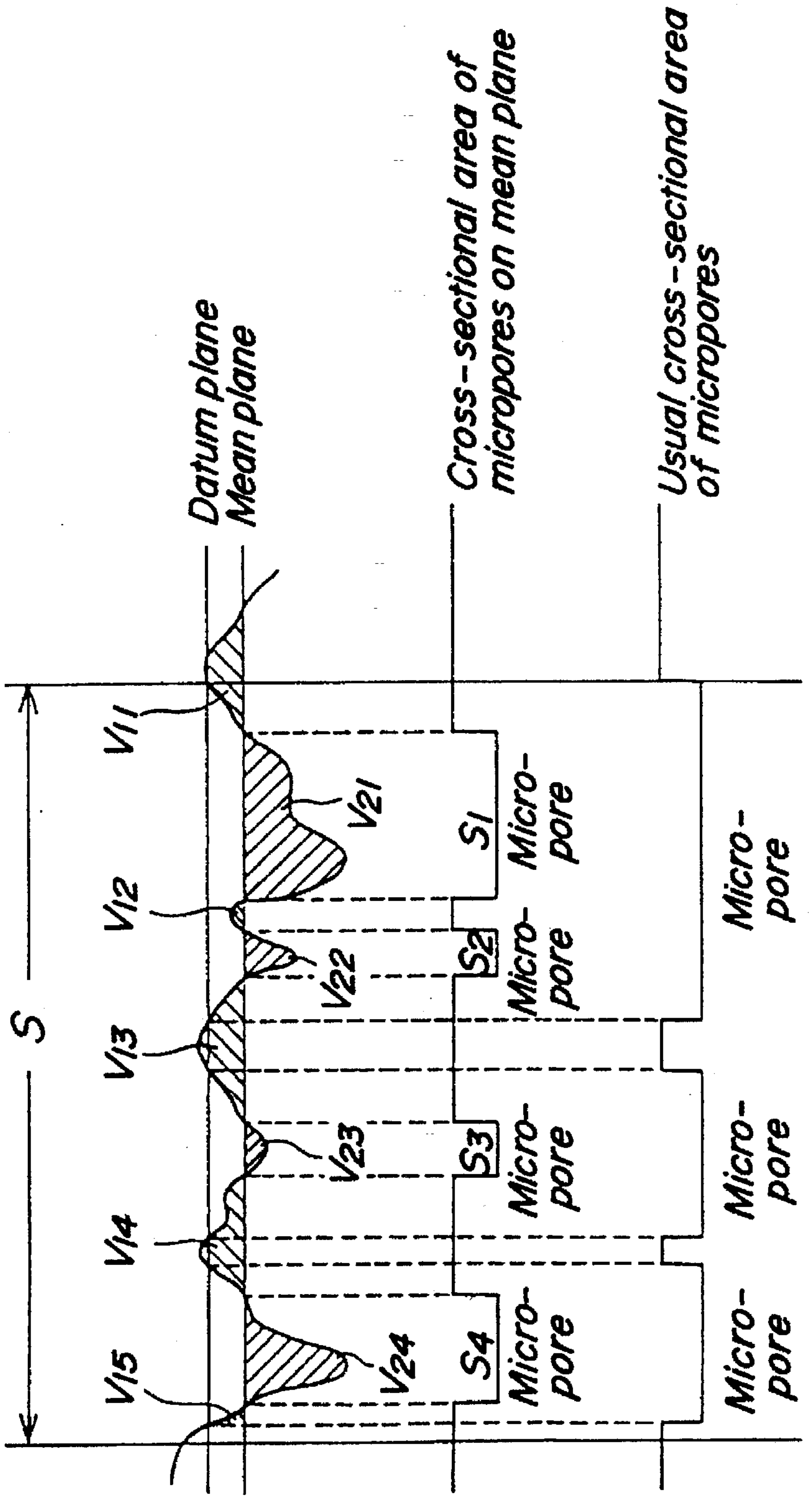
FIG. 1 is a profile of a filter surface for illustrating the definition of the Valley Level in the present invention.

In FIG. 1 is two-dimensionally shown and illustrated how to find the Valley Level. A mean plane is set so as to equalize the sum in volume of the projections above with the sum in volume of the recesses below, with respect to the mean plane, within the range of measurement, S. Namely, the mean plane is set to satisfy the following equation (1):

$$(V_{11}+V_{12}+V_{13}+V_{14}+V_{15})=(V_{21}+V_{22}+V_{23}+V_{24}) \quad (1)$$

wherein V represents volume of projections or recessions.

Recesses having cross-sectional areas, $s_1$, $s_2$, $s_3$ and $s_4$, respectively, appear when the surface of the filter is cut on the level of the mean plane. The ratio of the sum of the cross-sectional areas of the recesses on the level of the mean plane to the whole area of the mean plane in the measurement range S is defined as the Valley Level which is represented by the following formula (2):

$$\text{Valley Level}=(s_1+s_2+s_3+s_4)/S\times100 \quad (2)$$

It should be noted that, apart from the cross-sectional area of the recesses used in computing the Valley Level the concept of which has been introduced into the present invention, a usual cross-sectional area of pores is found by means of image analysis, such as SEM or the like, and its obtained value is larger than a cross-sectional area of recesses appearing on the level of the mean plane which is used in computing the Valley Level, as shown in FIG. 1.

During collecting fine particles, though they may be collected on the whole surface of the filter, the fine particles are, in particular, preferentially collected in the pores on the surface. This is because the fine particles are collected and deposit selectively in the pore portions on the surface where pressure loss is low. Since it is difficult to remove thoroughly the deposits of the fine particles from the pore portions of the surface by means of blowback air, the effective area of the filter becomes decreased with the consequence that the pressure loss is increased.

In this case, pores in which fine particles are preferentially collected are those opening on the surface lower than the mean plane which has been set by the measurement of the surface roughness. Namely, amongst the cross-sectional areas of the pores on the surface, those to have an effect on collection and release of fine particles are the cross-sectional area of the pores on the level of the mean plane and not the whole area of the pores opening on the surface which is derived from image analyses, such as SEM or the like.

If the cross-sectional area of the pores on the level of the mean plane, i.e., Valley Level, is decreased, the portions in which fine particles are preferentially collected are decreased. Therefore, the collected fine particles are improved in releasability during blowback procedures with the consequence that the effective area of the filters is scarcely decreased. Accordingly, with decreasing the Valley Level, the regeneration efficiency of the filters will increase.

The present invention has been achieved by the above findings. Namely, as described above, the exhaust gas filter of the first embodiment of the present invention that is used for collecting fine particles contained in exhaust gases discharged from internal combustion engines is characterized by a Valley Level of the surface of not more than 20%, a porosity of between 40% and 55% and an average pore diameter between 5 μm and 50 μm.

When the Valley Level is 20% or less, releasability of fine particles collected on the surface of the filter will be improved and, therefore, efficiency of regeneration of the filter by means of blowback air is improved as well. In order to further decrease pressure losses, the Valley Level is preferred to be not more than 10%. If the Valley Level exceeds 20%, the releasability of the collected fine particles from the surface of the filter is so low during blowback that the pressure loss may be increased. Additionally, even when the Valley Level is 20% or less, if the filter has a porosity of less than 40%, the blowback air flows too slowly to release thoroughly the collected fine particles, thereby also causing pressure loss increase. On the other hand, if the porosity exceeds 55%, the mechanical strength of the filter will be decreased undesirably. Additionally, even when the Valley Level is 20% or less, if the filter has an average pore diameter of less than 5 μm, the blowback air flows too slow to release thoroughly the collected fine particles, thereby also causing pressure loss increase. On the other hand, if the average pore diameter exceeds 50 μm, the efficiency of collecting fine particles will be decreased.

Alternatively, the exhaust gas filter of the second embodiment of the present invention also used for collecting fine particles contained in exhaust gases discharged from internal combustion engines, has a two-layer structure comprising a filter substrate and a filter layer provided on the surface of the filter substrate, and is characterized by a Valley Level of a surface of the above filter layer of not more than 20%, a porosity of the above filter substrate of between 45% and 60%, and an average pore diameter of the above filter substrate of between 10 μm and 80 μm.

The technique of the present invention to improve in releasability of collected and deposited fine particles and increase in regeneration efficiency of the filters, by means of lowering the Valley Level, is particularly effective when it is applied to the filters of the two-layer structure comprising a filter substrate and a filter layer. This is because, in usual monolayer filters, it is difficult to control concurrently three parameters: Valley Level, porosity and average pore diameter, and further achieve the decrease of the coefficient of thermal expansion. The decrease of the Valley Level of the surface of the filter layer to 20% or less is facilitated by forming the filter into the two-layer structure, fabricating the filter substrate with attention being paid to air-permeability, mechanical strength, heat resistance and the like, and the filter layer with attention being paid to the Valley Level. Additionally, when the filter layer is formed to have a Valley Level of 20% or less and, at the same time, so as not to block open-pores on the surface of the filter substrate, the pressure loss can be decreased without negatively affecting the collection efficiency, so that such filters are more preferable.

The filters of two-layer structure, since the filter layer, in general, has a mechanical strength higher than the filter substrate, exhibit a sufficient mechanical strength as compared with filters of monolayer structure, even when the filter substrate has a somewhat high porosity. Therefore, an appropriate porosity of the filter substrate is in the range between 45% and 60%. Furthermore, since the filter layer adds an air-permeation resistance, the open-pores on the surface of the filter substrate are preferred to have a larger diameter as compared with filters of monolayer structure. However, diameters of more than 80 μm are not preferred, because which will allow particles forming the filter layer to enter into the filter substrate, resulting in high pressure losses.

In the above second embodiment, it is preferred that the filter layer virtually does not block open-pores on the surface of the filter substrate.

If the filter layer blocks the pores opening on the surface of the filter substrate, the porosity of the whole two-layer filter including the filter layer becomes lower than that of the filter substrate alone and, moreover, particles which form the filter layer may enter into the filter substrate, resulting in high pressure losses.

In both the above first and second embodiments of the present invention, the exhaust gas filter is preferred to comprise a ceramic material comprising at least one main crystalline component selected from the group consisting of cordierite, mullite and alumina.

Further, the exhaust gas filter according to the present invention is preferred to be composed of a honeycomb structure.

Furthermore, the exhaust gas filter according to the present invention is preferred to comprise, particularly, as a main crystalline component of the filter or filter substrate, cordierite, and has a coefficient of thermal expansion, along a direction of exhaust flow, of at most $1.0\times10^{-6}$/° C. between 40° C. and 800° C.

If the coefficient of thermal expansion is in excess of $1.0\times10^{-6}$/° C., the thermal shock resistance of the filters will decrease to such a degree that the filters cannot be adapted for application in an exhaust gas filter for diesel engines. In order to maintain the thermal shock resistance for a long period of time, the coefficient of thermal expansion is more preferably not more than $0.8\times10^{-6}$/° C.

According to the present invention, the exhaust gas filters are improved in regeneration efficiency by virtue of a synergetic effect of adequate Valley Level, porosity and average pore diameter provided therein.

Particularly in the second embodiment of the present invention, the exhaust gas filters of two-layer structure are easy to control concurrently three parameters thereof: Valley Level, porosity and average pore diameter.

Further in this second embodiment, if the filter layer virtually does not block open-pores on the surface of the filter substrate, pressure losses can be kept low.

Furthermore, according to the present invention, the exhaust gas filters can have sufficient thermal shock resistance and mechanical strength by virtue of using a ceramic material comprising at least one main crystalline component selected from the group consisting of cordierite, mullite and alumina. Particularly with a ceramic material comprising cordierite as a main crystalline component, and with a coefficient of thermal expansion in the direction of exhaust flow of at most $1.0\times10^{-6}$/° C., the filters according to the present invention have an excellent thermal shock resistance.

Furthermore, the exhaust gas filter according to the present invention, since it comprises a honeycomb structure having a large surface area per volume, can be formed into a compact size with a sufficient mechanical strength.

Additionally, the present invention is further embodied in an apparatus for treating exhaust gases, comprising the above-described filters of the first or second embodiment of the invention, which is characterized in that blowback air is used to regenerate the filters.

The above apparatus for treating exhaust gases is used with a diesel engine mounted on motor vehicles.

In the apparatus for treating exhaust gases according to the above embodiment of the present invention, the filters having a releasability of fine particles improved by lowering the Valley Level is regenerated by means of blowback air. Therefore, the apparatus for treating exhaust gases comprising the filters according to the present invention has an excellent regeneration efficiency of the filters.

Furthermore, the apparatus for treating exhaust gases mounted on a diesel engine can collect efficiently fine particles which are exhausted from the diesel engine and cause environmental disruption, such as air pollution, and decrease catalytic activity.

The present invention will be explained in more detail by way of examples hereinafter.

In the examples, the physical properties of the filters were determined according to the following methods.

Physical Properties (1) Porosity

The porosity was determined by the Boiling Method shown in JIS R-2206.

(2) Average pore diameter

The average pore diameter was determined by the Mercury Injecting Method.

(3) Valley Level

By an instrument for the measurement of surface roughness by the stylus method, with a diamond stylus having a tip curvature radius of 2 μm, a surface roughness was measured under the conditions of: a measuring field of view of 0.8 mm×0.8 mm; a measuring pitch of 1.5 μm; and a stylus load of 85 mgf. Then the Valley Level was determined, based on the above-described definition, as a mean value of 5 measurements.

(4) Coefficient of thermal expansion

With a sample 50 mm long in the direction of exhaust gas flow, and 5 mm wide, an average coefficient of thermal expansion from 40° C. to 800° C. (referred to as "CTE" in Table 2 below) was determined.

Characteristics (a) Pressure loss

Using a 2,000 cc diesel engine as an exhaust gas supply source, fine particles were collected under the running conditions of: an exhaust gas temperature of 400° C.; an average amount of generating fine particles of 17 g/hr; and an exhaust gas flow rate of 3 $m^3$/min., while the filters were regenerated under the conditions of: a blowback air pressure of 6 kg/$cm^2$; a blowback interval of 5 min.; and a blowback time of 0.5 sec. Under these conditions, the engine was continually run for 20 hours and then the pressure loss was substantially stabilized. Therefore, after 20 hour running, the change of the pressure loss was considered to be minute. Accordingly, the value of the pressure loss 20 hours after the commencement of the test was used for appraisal of performance.

The pressure loss is desired to be at most 1,000 $mmH_2O$ from the practical point of view.

(b) Collection efficiency

The amount of fine particles recollected in a receiving reservoir was measured after 3 hours from the commencement of the test running of the engine under the same conditions as in the measurement of the pressure loss. The ratio of the amount of the recollected fine particles measured to the amount of fine particles generated from the exhaust gas supply source represented a collection efficiency. Calculation of the collection efficiency is shown in the following formula (3):

$$(\text{Amount of recollected fine particles/generated fine particles})\times 100 \quad (3)$$

The collection efficiency is desired to be at least 90% from the practical point of view.

(c) A-axis compressive strength

The axial direction of a cylindrical sample of 2.5 cm dia.×2.5 cm length was assumed to be an A-axis. The compressive strength in the A-axis direction was determined and unit conversion was made.

The compressive strength is desired to be at least 100 $kg/cm^2$ from the practical point of view.

(d) Thermal shock resistance

A sample was placed in an electric oven and heated from 500° C. with a 50° C. step-up, each step being kept for 30 min. At each temperature step, the sample was taken out to room temperature and tested by knocking or observed visually. Until thick sound was heard by knocking or a crack was observed, the step-up was repeated. The maximum temperature before crack development was assumed as a measured value of the thermal shock resistance (referred to as "TSR" in Table 2 below).

The TSR is desired to be at least 700° C. from the practical point of view.

EXAMPLE 1

Filter sample Nos. 1–15 having various Valley Levels, porosities and average fine particle diameters as shown in Table 1 were manufactured according to the following method:

Manufacture of Ceramic Filters

Blending talc, kaolin, alumina, silica and other materials for forming cordierite, each in the range of amount for cordierite-formation to progress satisfactorily, and the blend was admixed and kneaded with shaping aids, such as methylcellulose, surfactants or the like, and solvents, such as water, alcohols or the like. The resultant blend was extruded and shaped into a honeycomb structure of 118 mm dia.×152 mm length, having a partition wall thickness of 430 μm and a cell density of 15.5 cells/$cm^2$. This honeycomb structure was fired at temperatures for a cordierite-formation reaction enough to progress. Then, the throughholes of this honeycomb structure were sealed in a so-called "zigzag fashion" such that adjacent throughholes were sealed alternately at one end and the other. Thus, a ceramic filter of wall-flow type was manufactured.

The properties and characteristics of the resulting ceramic filters were appraised according to the above-described methods. The results are shown in Table 1 below.

TABLE 1

| Sample No. | Valley level (%) | Porosity (%) | Average pore diameter (μm) | Pressure loss ($mmH_2O$) | Collection efficiency (%) | A-axis Compressive strength ($Kg/cm^2$) | |
|---|---|---|---|---|---|---|---|
| 1 | 20 | 40 | 15 | 990 | 97 | 138 | Example |
| 2 | 20 | 50 | 16 | 970 | 95 | 120 | |
| 3 | 20 | 55 | 15 | 970 | 94 | 101 | |
| 4 | 20 | 50 | 5 | 990 | 98 | 124 | |
| 5 | 20 | 50 | 20 | 970 | 94 | 118 | |
| 6 | 20 | 50 | 48 | 970 | 92 | 112 | |
| 7 | 15 | 50 | 14 | 870 | 95 | 118 | |
| 8 | 10 | 50 | 15 | 780 | 94 | 115 | |
| 9 | 5 | 50 | 15 | 660 | 95 | 121 | |
| 10 | 1 | 50 | 14 | 570 | 96 | 117 | |
| 11 | 20 | 38 | 14 | 1030 | 97 | 140 | Comparative Example |
| 12 | 20 | 57 | 15 | 970 | 94 | 95 | |
| 13 | 20 | 50 | 3 | 1020 | 99 | 130 | |
| 14 | 20 | 50 | 52 | 950 | 89 | 110 | |
| 15 | 22 | 50 | 15 | 1070 | 95 | 120 | |

As is apparent from Table 1, the filter samples having a porosity of 40% to 55%, an average pore diameter of 5 μm–50 μm and a Valley Level of 20% or less (Sample Nos. 1–10) had an excellent performance characteristic of low pressure loss, improved collection efficiency and high A-axis compressive strength.

In contrast therewith, the sample having a Valley Level of more than 20% (Sample No. 15), showed a poor releasability of deposited fine particles during blowing-back and increased pressure loss, so that it was found to be not adaptable for practical use. Alternatively, the sample having a porosity of less than 40% (Sample No. 11), since the blowback air flowed therethrough too slow for deposited fine particles enough to release, also increased in its pressure loss. Even when the Valley Level was lowered to improve the releasability of the fine particles, the pressure loss could not be kept low, still due to a poor releasability. Alternatively, the sample having a porosity of more than 55% (Sample No. 12) decreased in its mechanical strength shown as an A-axis compressive strength, so that it could not possess even a minimal strength necessary for being mounted on motor vehicles or the like. Alternatively, the sample having an average pore diameter of less than 5 μm (Sample No. 13), since the blowback air flowed therethrough too slow as in the case of too low porosity, also increased in its pressure loss due to a poor releasability of fine particles, even when the Valley Level was lowered to improve the releasability. On the other hand, the sample having an average pore diameter of more than 50 μm (Sample No. 14) decreased in its collection efficiency, so that its performance as a filter was found to be insufficient.

EXAMPLE 2

Filter sample Nos. 16–19 having various Valley Levels, porosities and average fine particle diameters as shown in Table 2 were manufactured in the same manner as Example 1 and appraised according to the above-described methods. In addition to the appraisal items in Example 1, the average coefficient of thermal expansion (CTE) and thermal shock resistance (TSR) were also appraised. The results are shown in Table 2.

TABLE 2

| Sample No. | Valley level (%) | Porosity (%) | Average pore diameter (µm) | Pressure loss ($mmH_2O$) | Collection efficiency (%) | A-axis compressive strength ($Kg/cm^2$) | CTE ($\times 10^{-6}$/C.°) | TSR (°C.) | |
|---|---|---|---|---|---|---|---|---|---|
| 16 | 10 | 50 | 14 | 790 | 95 | 114 | 1.0 | 700 | Example |
| 17 | 10 | 50 | 14 | 780 | 94 | 110 | 0.8 | 750 | |
| 18 | 10 | 50 | 15 | 790 | 94 | 110 | 0.7 | 750 | |
| 19 | 10 | 50 | 15 | 780 | 94 | 115 | 1.3 | 600 | Comparative Example |

In the installing position of filters generally used in diesel engines, the maximum temperature is about 700° C. and a maximum temperature difference undergoing during rapid cooling is considered to be 700° C. Therefore, it is desired that the filters exhibit a thermal shock resistance of at least 700° C. As is clear from Table 2, the samples having an average coefficient of thermal expansion of not more than $1.0\times10^{-6}$/° C. (Sample Nos. 16–18) exhibited a thermal shock resistance of 700° C. or more. Additionally, in order to maintain a high thermal shock resistance for a long period of time, it is considered that an initial thermal shock resistance of at least 750° C. would be required. It is found from Table 2 that the samples having an average coefficient of thermal expansion of not more than $0.8\times10^{-6}$/° C. (Sample Nos. 17 and 18) satisfy this requirement.

As is apparent from the above, filters to be mounted on motor vehicles are required to have a high thermal shock resistance other than a low Valley Level, and in order to satisfy this requirement, it will be necessary that the average coefficient of thermal expansion is not more than $1.0\times10^{-6}$/° C., preferably not more than $0.8\times10^{6}$/° C.

EXAMPLE 3

In this Example, ceramic filters of two-layer structure, Sample Nos. 20–33, were manufactured according to the following method:

Manufacture of Ceramic Filters of Two-layer Structure

Blending talc, kaolin, alumina, silica and other materials for forming cordierite, each in the range of amount for cordierite-formation to progress satisfactorily, and the blend was admixed and kneaded with shaping aids, such as methylcellulose, surfactants or the like, and solvents, such as water, alcohols or the like. The resultant blend was extruded and shaped into a honeycomb structure of 118 mm dia.×152 mm, having a partition wall thickness of 380 µm and a cell density of 15.5 cells/$cm^2$. This honeycomb structure was fired at temperatures for a cordierite-formation reaction enough to progress. Then, the throughholes of this honeycomb structure were sealed in a so-called "zigzag fashion" such that adjacent throughholes were sealed alternately at one end and the other. Thus, a filter substrate was manufactured. The surface of this filter substrate was coated with silica having an average particle diameter of 10 µm, by utilizing an alumina sol, which silica coating formed a filter layer 50 µm thick.

The properties and characteristics of the resulting two-layer filters were appraised according to the above-described methods. The results are shown in Table 3 below.

TABLE 3

| | Filter substrate | | Filter | Whole body of 2-layer filter | | | | |
|---|---|---|---|---|---|---|---|---|
| Sample No. | Porosity (%) | Average pore diameter (µm) | layer Valley level (%) | Porosity (%) | Pressure loss ($mmH_2O$) | Collection efficiency (%) | A-axis compressive strength ($Kg/cm^2$) | |
| 20 | 45 | 34 | 9 | 43 | 940 | 96 | 136 | Example |
| 21 | 60 | 36 | 10 | 54 | 780 | 95 | 115 | |
| 22 | 55 | 10 | 11 | 55 | 900 | 96 | 120 | |
| 23 | 55 | 80 | 10 | 53 | 960 | 95 | 103 | |
| 24 | 55 | 36 | 20 | 54 | 990 | 94 | 117 | |
| 25 | 55 | 35 | 5 | 55 | 650 | 96 | 116 | |
| 26 | 55 | 36 | 10 | 56 | 730 | 95 | 116 | |
| 27 | 55 | 35 | 11 | 58 | 680 | 94 | 116 | |
| 28 | 55 | 35 | 10 | 50 | 810 | 96 | 120 | |
| 29 | 43 | 35 | 10 | 42 | 1020 | 96 | 140 | Comparative Example |
| 30 | 63 | 35 | 10 | 59 | 720 | 95 | 98 | |
| 31 | 55 | 8 | 9 | 54 | 1050 | 96 | 120 | |
| 32 | 55 | 83 | 9 | 52 | 1030 | 96 | 112 | |
| 33 | 55 | 36 | 23 | 55 | 1080 | 95 | 116 | |

As is apparent from Table 3, the filter samples having a porosity of 45% to 60%, an average pore diameter of 10 μm–80 μm and a Valley Level of 20% or less (Sample Nos. 20–28) had an excellent performance characteristic of low pressure loss, improved collection efficiency and high A-axis compressive strength.

In contrast therewith, the sample having a Valley Level of more than 20% (Sample No. 33), showed a poor releasability of deposited fine particles during blowing-back and increased pressure loss, so that it was found to be not adaptable for practical use. Alternatively, even though having a Valley Level of less than 20%, the sample having a porosity of less than 45% (Sample No. 29), since the blowback air flowed therethrough too slow for deposited fine particles enough to release, also increased in its pressure loss. Alternatively, the sample having a porosity of more than 60% (Sample No. 30) decreased in its mechanical strength, so that it could not possess even a minimal strength necessary for being mounted on motor vehicles or the like. Alternatively, the sample having an average pore diameter of less than 10 μm (Sample No. 31), since the blowback air flowed therethrough too slow, also increased in its pressure loss due to a poor releasability of fine particles.

Additionally, when the filter layer was formed on the surface of the filter substrate in such a manner that the filter layer might not block open-pores on the surface of the filter substrate, the resulting two-layer filters (Sample Nos. 26 and 27), as a whole, had a porosity generally higher than the porosity of the filter substrate alone. It was found that such samples had a lower pressure loss, as compared with the two-layer filter sample having pores on the surface of the filter substrate blocked with the filter layer (Sample No. 28).

Therefore, in order to prevent increase of pressure losses in the filter of two-layer structure, it is preferred that the open-pores on the surface of the filter substrate are not blocked with the filter layer. However, it is much more difficult to form a filter layer on the surface of the filter substrate without blocking than with blocking (as Sample No. 28) the open-pores on the surface of the filter substrate with a filter layer. Particularly, it is true when the open-pores have a large average pore diameter, because the larger the pore diameter, the more fine particles of the filter layer readily enter and are apt to block the open-pores, resulting in a pressure loss of even more than 1,000 $mmH_2O$. As a result of investigation, it has been found that an average pore diameter to virtually keep the fine particles of the filter layer out of open-pores of the filter substrate should be at most 80 μm in the two-layer filter, in order to prevent increase of pressure losses.

EXAMPLE 4

Figure 2:
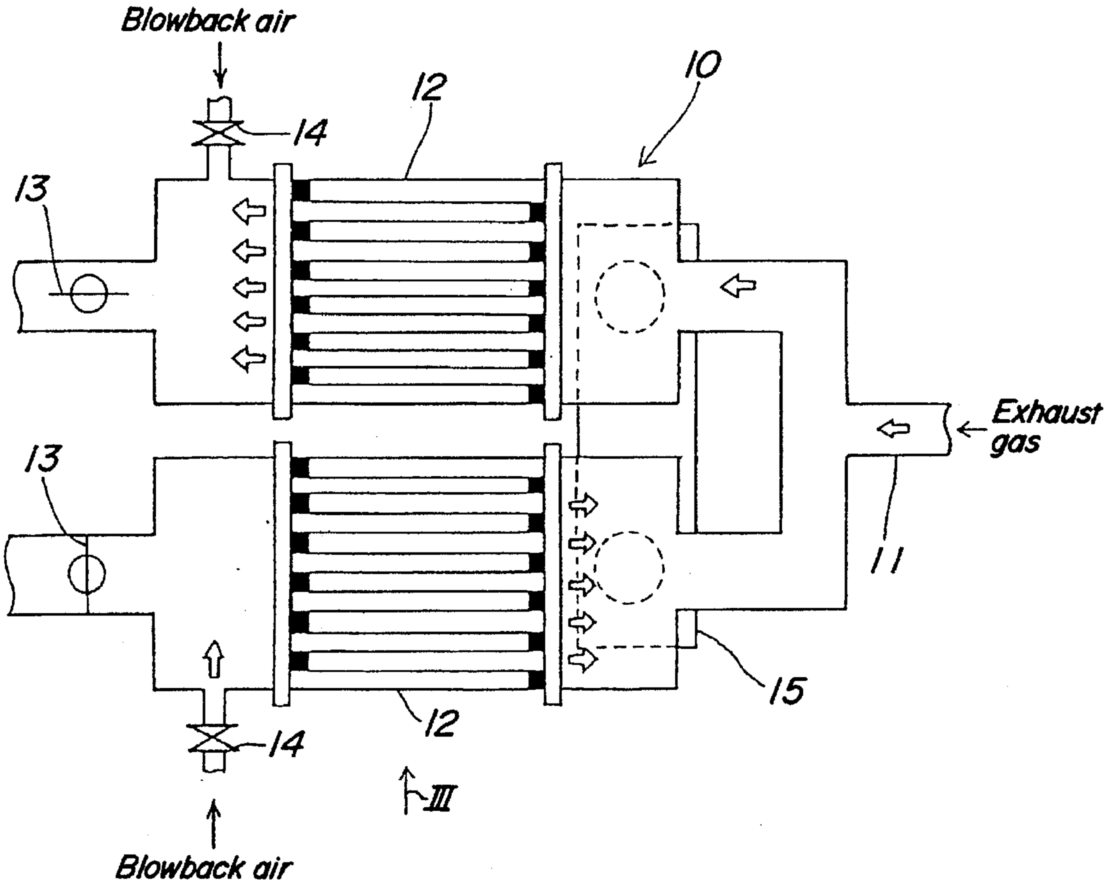
FIG. 2 is a schematic view of an apparatus for treating exhaust gases with exhaust gas filters according to the present invention.
Figure 3:
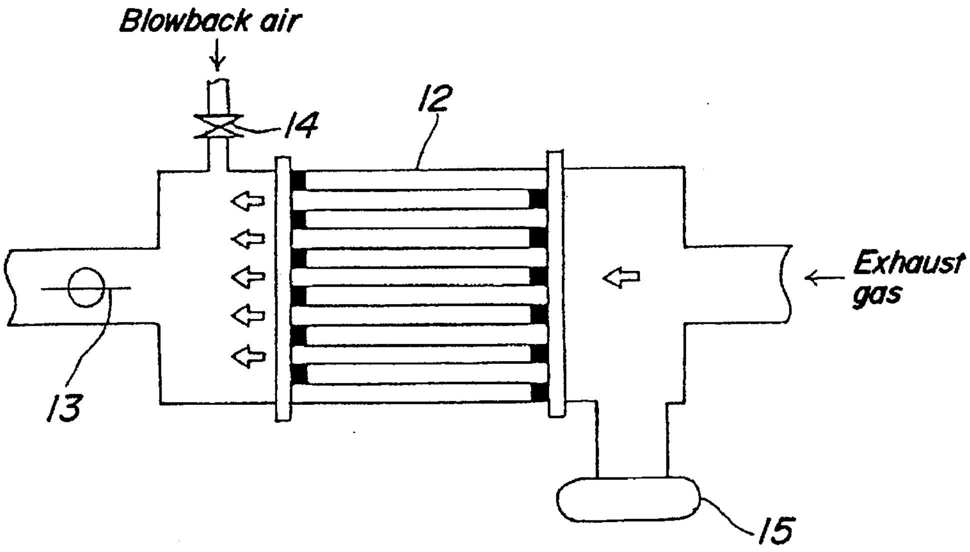
FIG. 3 is a schematic elevation of the apparatus for treating exhaust gases, viewed from the arrow m direction in FIG. 2.

In FIG. 2 is shown an example of a diesel engine mounted on a motor vehicle, equipped with an apparatus for treating exhaust gases wherein the exhaust gas filters manufactured in Examples 1–3 of the present invention were used.

In the apparatus for treating exhaust gases 10 shown in FIG. 2, during usual exhaust gas filtration (the usual exhaust gas filtration is referred to as "collection mode" hereinafter), the exhaust gases flow from an exhaust gas pipe 11 into each of exhaust gas filters 12. During the collection mode, since each exhaust valve 13 is opened, the exhaust gases flow into each exhaust gas filter 12 where fine particles mainly comprising carbon, contained in the exhaust gases, are collected, and then exhaust gases are discharged from the exhaust gas treating apparatus 10.

During blowback-to-regenerate (the blowback-to-regenerate is referred to as "blowback mode" hereinafter), an exhaust valve 13 on the regeneration side, such as the lower exhaust valve 13 in FIG. 2, is closed to stop flowing of the exhaust gases into exhaust gas filters 12 to be regenerated, and a solenoid valve 14 is opened to inject blowback air into the exhaust gas filters 12. Thus, the gas filters are regenerated. Fine particles discharged are pneumatically conveyed to a collector tank 15, i.e., a device for receiving the recollected fine particles. The conveyed and recollected fine particles are disposed of by burning with an electric heater, burner or the like (not shown), or recovered by dismounting the collector tank 15 from the exhaust gas treating apparatus 10.

According to this example of the present invention, since exhaust gas filters having releasability of collected and deposited fine particles improved by controlling the Valley Level, porosity and average pore diameter of the exhaust gas filter 12 are regenerated by means of blowback air, the exhaust gas filters have an excellent regeneration efficiency.

What is claimed is:

1. An exhaust gas filter for collecting fine particles contained in exhaust gases discharged from internal combustion engines, comprising a filter substrate and a filter layer provided on a surface of said filter substrate, said filter layer having a surface with a Valley Level of not more than 20%, and said filter substrate having a porosity of between 45% and 60% and an average pore diameter of between 10 μm and 80 μm.

2. The exhaust gas filter according to claim 1, wherein said filter layer does not substantially block open-pores on the surface of said filter substrate.

3. An apparatus for treating exhaust gases discharged from internal combustion engines, comprising an exhaust gas filter for collecting fine particles contained in the exhaust gases, and an air-blowback means to regenerate said exhaust gas filter, said exhaust gas filter comprising a filter substrate and a filter layer provided on a surface of said filter substrate, said filter layer having a surface with a Valley Level of not more than 20%, and said filter substrate having a porosity of between 45% and 60% and an average pore diameter of between 10 μm and 80 μm.

4. The apparatus according to claim 3, wherein said internal combustion engines are diesel engines mounted on motor vehicles.

* * * * *